United States Patent
Li

(10) Patent No.: US 10,275,067 B2
(45) Date of Patent: Apr. 30, 2019

(54) PRESSURE SENSOR, DISPLAY APPARATUS AND ELECTRONIC DEVICE

(71) Applicant: SHENZHEN NEW DEGREE TECHNOLOGY CO., LTD., Shenzhen (CN)

(72) Inventor: Hao Li, Shenzhen (CN)

(73) Assignee: SHENZHEN NEW DEGREE TECHNOLOGY CO., LTD., Shenzhen (CN)

(*) Notice: Subject to any disclaimer, the term of this patent is extended or adjusted under 35 U.S.C. 154(b) by 72 days.

(21) Appl. No.: 15/503,193

(22) PCT Filed: Apr. 10, 2015

(86) PCT No.: PCT/CN2015/076303
§ 371 (c)(1),
(2) Date: Feb. 10, 2017

(87) PCT Pub. No.: WO2016/161627
PCT Pub. Date: Oct. 13, 2016

(65) Prior Publication Data
US 2017/0235402 A1    Aug. 17, 2017

(51) Int. Cl.
*G06F 3/041* (2006.01)
*G01L 1/04* (2006.01)

(52) U.S. Cl.
CPC .............. *G06F 3/0414* (2013.01); *G01L 1/04* (2013.01); *G06F 2203/04103* (2013.01); *G06F 2203/04105* (2013.01)

(58) Field of Classification Search
CPC ................... G06F 3/0414; G06F 3/041; G06F 2203/04103; G06F 2203/04105; G01L 1/04
See application file for complete search history.

(56) References Cited

U.S. PATENT DOCUMENTS 7,696,987 B2 * 4/2010 Popovich ................ G06F 3/045
178/19.01
8,963,874 B2 * 2/2015 Li .......................... G06F 3/0414
345/174

(Continued)

FOREIGN PATENT DOCUMENTS

| CN | 102507053 | 6/2012 |
| CN | 103576960 | 2/2014 |
| CN | 104035688 | 9/2014 |

OTHER PUBLICATIONS

International Search Report for PCT/CN2015/076303, dated Jan. 20, 2016, 4 pages.

*Primary Examiner* — Tom V Sheng
(74) *Attorney, Agent, or Firm* — Nixon & Vanderhye PC

(57) ABSTRACT

The invention disclosed is a pressure sensor, comprising: a pressure sensing plate and a strain sensing unit which are arranged in a stacked manner, wherein the thickness of the pressure sensing plate is 0.2 3 mm, and the material of the pressure sensing plate is an elastic material with a Young's modulus not greater than 120 GPa. Also disclosed is a display apparatus, comprising a panel, a pressure sensing plate and a strain sensing unit which are arranged in a stacked manner in sequence, wherein the thickness of the pressure sensing plate is 0.2 3 mm, and the material of the pressure sensing plate is an elastic material with a Young's modulus not greater than 120 GPa. Also disclosed is an electronic device comprising the pressure sensor, and an electronic device comprising the display apparatus. The pressure sensor, the display apparatus and the electronic device disclosed can magnify the size of pressure and deformation, so that a pressure deformation signal can be detected using a relatively small pressure, and detection precision is improved.

13 Claims, 1 Drawing Sheet

(56) References Cited

U.S. PATENT DOCUMENTS

| | | | | |
|---|---|---|---|---|
| 9,477,342 B2* | 10/2016 | Daverman | ............ | G06F 3/0414 |
| 2014/0238152 A1* | 8/2014 | Kallassi | ............. | G01R 27/2605 |
| | | | | 73/862.626 |
| 2016/0062517 A1* | 3/2016 | Meyer | ................... | G06F 3/0414 |
| | | | | 345/173 |
| 2016/0327441 A1* | 11/2016 | Iwase | ................... | A61B 5/1036 |
| 2017/0288283 A1* | 10/2017 | Fukuda | ............... | H01M 10/482 |

* cited by examiner

US 10,275,067 B2

PRESSURE SENSOR, DISPLAY APPARATUS AND ELECTRONIC DEVICE

This application is the U.S. national phase of International Application No. PCT/CN2015/076303 filed 10 Apr. 2015, the entire contents of which is hereby incorporated by reference.

TECHNOLOGY FIELD

The present invention relates to the field of pressure sensor, and particularly to a pressure sensor, a display apparatus including the pressure sensor, and an electronic device including the pressure sensor or the display apparatus.

BACKGROUND

At present, pressure sensors have been gradually applied to various fields. The pressure sensors mainly increase the amount of information to be detected, and enable pressure control. Pressure control can provide effective control of switching action, or the encryption of the information.

The pressure sensors in prior art are generally capacitive sensors or piezoelectric ceramic sensor. The existing pressure sensors are all formed by complex circuit design and structural design. For example, capacitive sensors need to precisely control distances between each capacitor point and the panel and obtain pressure information through the changes of the distance. As a result, capacitive pressure sensors require high processing accuracy and assembly accuracy to be achieved. Piezoelectric ceramic sensors measure different pressure through transient voltage changes induced by instantaneous impacts applied on piezoelectric ceramic. Piezoelectric ceramic pieces uniform in size are required to produce effective piezoelectric ceramic sensors, and the pieces need be fixed on a preset structure through special installation method, which greatly increases the cost and the range of application of piezoelectric pressure sensors, limits the large-scale adoption of pressure sensor, and results in the limits use of piezoelectric pressure sensors.

SUMMARY

The present invention aims to overcome the above-mentioned shortages of the prior art, and provides a pressure sensor which may amplify the applied pressure and the generated deformation on the pressure sensor by selecting a pressure sensitive plate having a large thickness and a low Young's modulus, so that the amplified pressure strain signal can be easily detected.

The present invention aims to overcome the above-mentioned shortages of the prior art, and provides a display apparatus which may amplify the applied pressure and the generated deformation on the pressure sensor by selecting a pressure sensitive plate having a relatively thick thickness and a low Young's modulus, so that the amplified pressure strain signal may be easily detected.

The present invention aims to overcome the above-mentioned shortages of the prior art, and provides an electronic device adopting the above-mentioned pressure sensor which may amplify the applied pressure and the generated deformation on the pressure sensor, so that the amplified pressure strain signal may be easily detected.

The present invention aims to overcome the above-mentioned shortages of the prior art, and provides an electronic device using the above-mentioned display apparatus which may amplify the applied pressure and the generated deformation on the pressure sensor, so that the amplified pressure strain signal may be easily detected.

In order to achieve the above-mentioned objectives, the technical solutions of the embodiment of the present invention are provided as following:

A pressure sensor, comprise: a stack-arranged pressure sensitive plate and a strain sensing unit, the thickness of the pressure sensitive plate is 0.2~3 mm, the pressure sensitive plate is made of elastic material having a Young's modulus not larger than 120 GPa.

A display apparatus, which comprises a stack-arranged panel, a pressure sensitive plate and a strain sensing unit, the thickness of the pressure sensing plate is 0.2~3 mm, the pressure sensitive plate is made of elastic material having a Young's modulus not larger than 120 GPa.

An electronic device, comprises the above-mentioned pressure sensor.

An electronic device, comprises the above-mentioned display apparatus.

The pressure sensor of the present invention selects a pressure sensitive plate with a lower Young's modulus, the amount of bending at the press point on the pressure sensitive plate will not be weakened due to the increase of the thickness of the material, meanwhile the bending neutral axis of the pressure sensing plate (that is, the zero strain line when the strain changes from positive to negative) is drastically shifted, so that the curvature changes on the pressure sensing plate caused by the bending is enhanced to some degree, the corresponding strain signal detected by the strain sensitive unit is amplified; in addition, a pressure sensitive plate with a thicker thickness is selected, when the surface of the pressure sensitive plate is pressed (the press may be detected by the press sensing unit), since the strain sensing unit is arranged on the surface opposite to the pressing surface of the pressure sensitive plate, a deformation may be sensed only when it occurs on the surface directly opposite to the pressing surface, therefore, under the same conditions, the deformation of a thicker pressure sensing plate is more distinctive than the deformation of a thinner pressure sensing plate, thus the deformation caused by pressure is more distinctive as well, the strain signals detected by the strain sensing unit are amplified.

Since the display apparatus of the embodiment of the present invention has an above-mentioned pressure sensor, the curvature change on the pressure sensing plate caused by the bending deformation may be enhanced to some degree, and the strain signals detected by the strain sensing unit are amplified.

Since the display apparatus of the embodiment of the present invention has an above-mentioned pressure sensor, the curvature change on the pressure sensing plate caused by the bending deformation may be enhanced to some degree, and the strain signals detected by the strain sensing unit are amplified.

Since the display apparatus of the embodiment of the present invention has an above-mentioned display apparatus, the curvature change on the pressure sensing plate caused by the bending deformation may be enhanced to some degree, and the strain signals detected by the strain sensing unit are amplified.

DETAILED EMBODIMENTS

In order to achieve the objectives, technical solutions and advantages of the present disclosure be more clear, the present disclosure will be further described in detail hereinafter with reference to the accompanying drawings and embodiments. It should be understood that embodiments described here are only intended to interpret the present invention but not to limit the invention.

Figure 1:
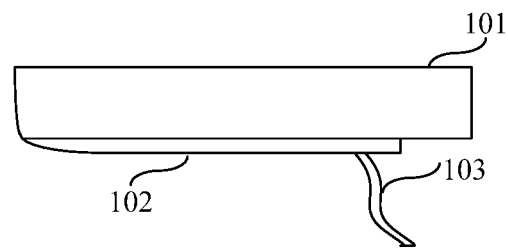
FIG. 1 is a side view of a pressure sensor according to an embodiment of the present invention.

An embodiment of the present invention provides a pressure sensor. FIG. 1 shows a side view of a pressure sensor according to an embodiment of the present invention. The pressure sensor comprises: a stack-arranged pressure sensitive plate 101 and a strain sensing unit 102. The thickness of the pressure sensitive plate 101 is 0.2~3 mm. In the present invention, the "thickness" is defined as the size of the layer structure along the stacking direction. The material of the pressure sensitive plate 101 is an elastic material having a Young's modulus not larger than 120 GPa. The "elastic material" in the present invention refers to a material which undergoes elastic deformation after being pressed within a certain pressure limit and may rebound back to its original shape before pressing while maintaining its own electronic and structural functions. For example, the pressure sensitive plate 101 may be bent and deformed along the neutral axis; alternatively, the pressure sensitive plate 101 may be collapsed and deformed along a point. Preferably, the Young's modulus of the material of the pressure sensitive plate 101 is not lager than 80 GPa. More preferably, the Young's modulus of the material of the pressure sensitive plate 101 is not lager than 40 GPa. The Young's modulus of the pressure sensing plate 101 allows the pressure sensing plate to, within a certain range of pressure, rebound back to its original shape before pressing and to maintain its own electronic and structural functions. The material of the pressure sensitive plate 101 may be glass, aluminum alloy, common plastic (e.g., PC, ABS, etc.), fiberglass sheet having a flame resistance rating of FR4 or copper alloy. For example, the pressure sensitive plate 101 may be glass having a Young's modulus of 70 GPa, aluminum alloy material having a Young's modulus of 70 GPa, a common plastic (PC, ABS, etc.) having a Young's modulus of 2.2~3.0 GPa, FR4 fiberglass sheet having a Young's modulus of 20 GPa, or copper alloy having a Young's modulus of 110 GPa.

The pressure sensing plate 101 transfers the pressure generated by pressing to the strain sensing unit 102.

The strain sensing unit 102 is used to realize a pressure sensing function, sense the position of the deformation and the magnitude of the pressure and the deformation generated by the pressure sensitive plate 101 and convert them into control information. The control information is transferred to a control circuit through a circuit, thus the operation of the electronic device may be controlled by the control circuit, such as switching operation, information encryption operation and so on. The strain sensing unit 102 includes a pressure sensitive layer and a sensing component arranged on the pressure sensitive layer. After the strain inducing unit 102 is disposed on the pressure sensitive plate 101, the sensing component of the pressure sensitive layer forms a sensing network on the pressure sensitive plate 101. Specifically, the sensing component is a press strain sensitive coating or wire provided on the pressure sensitive layer. In practice, the strain sensing unit 102 may be a strain sensitive polymer coating, or a sintered piezoelectric ceramic coating, a traditional metal filament strain gauge, and so on, but not limited to them. The strain sensing unit 102 may be a single independent pressure sensitive sensor, or any measurement device which is capable of sensing pressure. The strain sensing unit 102 may also adopt other techniques, such as quantum tunneling composites, capacitive sensors, or other pressure sensitive resistor technology.

The pressure sensor of the present invention select a pressure sensitive plate with a lower Young's modulus, the degree of bending at the press point on the pressure sensitive plate will not be weakened due to the increase of the thickness of the material, meanwhile the bending neutral axis of the pressure sensing plate (that is, the zero strain line when the strain changes from positive to negative) is drastically shifted, so that the curvature change on the pressure sensing plate caused by the bending is enhanced to some degree, the press strain signals detected by the strain sensitive unit are therefore amplified. Insofar as the thickness of the pressure sensitive plate satisfy the appearance requirements of the pressure sensor (such as the requirements on lightness and thinness), a pressure sensitive plate with a thicker thickness is selected, when the surface of the pressure sensitive plate is pressed (the press can be detected by the press sensing unit), since the strain sensing unit is arranged on the surface directly opposite to the pressing surface of the pressure sensitive plate, a deformation can be sensed only when it occurs on the surface directly opposite to the pressing surface. Therefore, under the same conditions, the deformation of a thicker pressure sensing plate is more distinctive than the deformation of a thinner pressure sensing plate, thus the deformation caused by pressure is more distinctive as well, the strain signal detected by the strain sensing unit is amplified, thus it's helpful to improve the sensitivity of the detection, and the function corresponding to the press point may be completed even the pressure is small.

The strain sensing unit 102 may be formed on the pressure sensitive plate 101 directly, or, they may be adhered to each other by glue, specific decision may be made according to actual need. In general, the thickness of the pressure sensitive plate 101 is thicker than the thickness of the strain sensing unit 102.

Shapes of the pressure sensitive plate 101 and the strain sensing unit 102 are not limited, and may be a flat plate, a curved plate, or a plate of other various shapes, specific decision may be made on the basis of actual need.

Preferably, the pressure sensor further comprises a detection unit (not shown). The sensing unit is electrically connected to the strain sensing unit 102. "Electrically connected" means that the connection may be realized by a connecting wire or the like, and it should be understood that this is not a limitation, other means which may electrically connecting the strain sensing unit 102 and the detection unit directly or indirectly are available. For example, in one embodiment, the strain sensing unit 102 is electrically connected to the detection unit through a connection line 103. The detection unit may function as a control center that receives control information transmitted by the strain sensing unit 102 and then control the corresponding electronic device, which is generally described as a combination of hardware and software having a plurality of processing methods. The hardware and software are configured to communicate and perform additional related tasks or functions according to the control information inputted by the strain sensing unit 102 via feedback or a system associated with the client's system. In particular, the detection unit may be a general processor, a content addressable memory, a digital signal processor, a D/A switch, a programmable logic device, discrete hardware components, or other combinations; while itself may contain embedded algorithms or software information related to the pressure touch screen/pressure sensing system and others. The hardware and software in the detection unit are configured to perform a variety of functions, techniques, feedbacks, and process tasks associated with the client's system.

The pressure sensor in the embodiments of the present invention may be directly attached to the inner surface of the electronic device panel when it is used, and the contact surfaces of the pressure sensitive plate and the panel may be bonded by adhesive 104. The adhesive 104 may be a double-sided adhesive, VHB acrylic foam, AB glue or the like. In this way, the user can directly apply the pressure sensor to the inner surface of the panel of the electronic device by adhesive 104 on the pressure sensitive plate 101.

Figure 2:
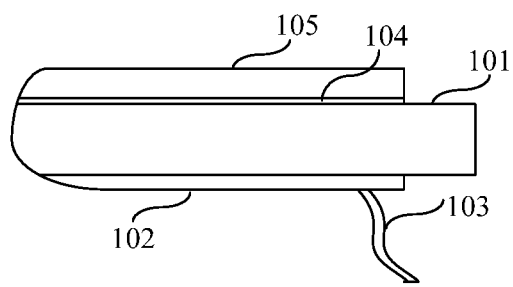
FIG. 2 is a side view of a display apparatus according to an embodiment of the present invention.
Figure 3:
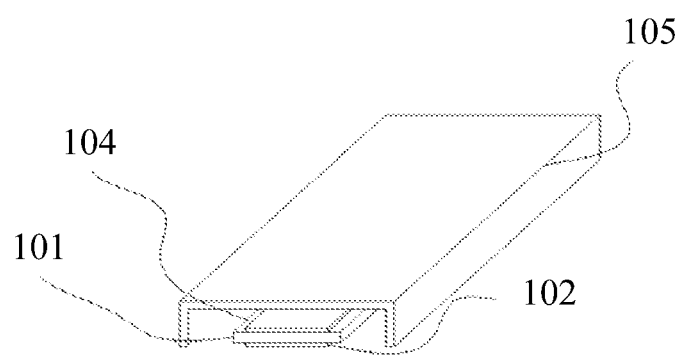
FIG. 3 is a perspective view of a display apparatus according to an embodiment of the present invention.

A display apparatus is also provided by an embodiment of the present invention. FIGS. 2 and 3 show the side view and the perspective view of the display apparatus of an embodiment of the present invention respectively. The display apparatus includes a stack-arranged panel 105, a pressure sensitive plate 101 and a strain inducing unit 102. The thickness of the pressure sensitive plate 101 is 0.2~3 mm, the material of the pressure sensitive plate 101 is elastic material having a Young's modulus not larger than 120 GPa. Preferably, the Young's modulus of the material of the pressure sensitive plate 101 is not lager than 80 GPa. More preferably, the Young's modulus of the material of the pressure sensitive plate 101 is not lager than 40 GPa. The pressure sensitive plate 101 and the strain sensing unit 102 constitute the abovementioned pressure sensor, the pressure sensitive plate and the strain sensing unit in the display apparatus are the same with the ones described above, thus will not be described again.

Preferably, the thickness and Young's modulus of the panel 105 and the pressure sensitive plate 101 satisfy the following relationship:

$$E_1 \times T_1^2 > E_2 \times T_2^2 \quad (1),$$

Wherein: $E_1$ is the Young's modulus of the material of the panel, $T_1$ is the thickness of the panel; $E_2$ is the Young's modulus of the material of the pressure sensitive plate, $T_2$ is the thickness of the pressure sensitive plate.

The panel and pressure sensing plate which satisfy the above-mentioned relationship can amplify the pressure more effectively, so that the strain sensing unit may detect pressure more easily.

In a preferred embodiment, the display apparatus also has a configuration of the above-mentioned detection unit, and structures and performances of the display apparatus are the same as those of the aforementioned detection unit which will not be described here.

The panel 105 may be attached to the surface of the pressure sensitive plate 101 directly opposite to the strain sensing unit 102 by glue. The panel 105 is made of elastomeric material with a certain degree of elastic deformation which can be manipulated by the user and maintain its structural rigidity. As described above, the "panel is an elastic material" in the present invention means a panel which undergoes elastic deformation after being pressed within a certain pressure limit and can rebound back to its original shape before pressing while still maintain its own electronic and structural functions. The panel 105 may be bended and deformed along the neutral axis; alternatively, the panel 105 may be collapsed and deformed along a point, or the panel 105 may have sufficient elastic deformation in order to match the lower layer of the pressure sensitive plate 101. The material of the face plate 105 may be stainless steel, aluminum alloy, or polycarbonates (PC). For example, the panel 105 may be stainless steel with a thickness of 0.8 mm, aluminum alloy with a thickness of 1.2 mm, or PC material with a thickness of 3 mm.

When a press is applied to the face plate 105, the pressure is transferred to the pressure sensing plate 101 and induce a same deformation on the pressure sensing plate 101, the pressure sensitive signal detected by the strain sensing unit is amplified by the pressure and deformation amplification function of the pressure sensing plate described above, thereby increasing the detection sensitivity, the corresponding function of the press point may be completed with a smaller press.

In a preferred embodiment, the Young's modulus of the material of the pressure sensitive plate 101 is less than the Young's modulus of the material of the panel 105. The panel 105 is required to maintain a rigid appearance and performance so that its Young's modulus may not be too small, otherwise the panel 105 will deform easily under pressure, which is detrimental to maintain the appearance of the product. Since the Young's modulus of the material of the pressure sensitive plate 101 is less than the Young's modulus of the material of the panel 105, the pressure sensing plate 101 is able to amplify the pressure while assures the appearance of the product. In one embodiment, the material of panel 105 may be 304 stainless steel having a Young's modulus of 194 GPa, and the material of the corresponding pressure sensitive plate 101 may be FR4 fiberglass sheet having a Young's modulus of about 20 GPa. In another embodiment, the material of panel 5 may be aluminum alloy, and the material of the corresponding pressure sensitive plate 101 may be PC.

In a preferred embodiment, the thickness of the pressure sensitive plate 101 is greater than the thickness of the panel 105, so that the pressure sensitive plate 101 may better amplify the deformation caused by the pressure. More preferably, the pressure sensitive plate 101 has a significant thickness advantage over the panel 105, the adhesive 104, and the pressure strain unit 102. In one embodiment, the panel 105 is a stainless steel panel having a thickness of 0.8 mm, the adhesive 104 is a double-sided adhesive having a thickness of 0.4 mm, and the pressure sensitive unit 102 is a 0.1 mm pressure sensitive layer, at this situation, the pressure sensitive plate 101 is a PC having a thickness of 1.0 mm. In another embodiment, the panel 105 is an aluminum alloy plate having a thickness of 1.2 mm, the adhesive 104 is a double-sided adhesive having a thickness of 0.6 mm, the pressure sensitive unit 102 is a 0.2 mm pressure sensitive layer, at this time, the pressure sensitive plate 101 is an FR4 fiberglass sheet having a thickness of 3.0 mm.

In a preferred embodiment, the Young's modulus of the material of the pressure sensitive plate 101 is less than the Young's modulus of the material of the panel 105 and the thickness of the pressure sensitive plate 101 is greater than the thickness of the face plate 105, so that the pressure and deformation may be further amplified as long as the appearance of the product is not affected. For example, the material of the panel 105 is a stainless steel having a Young's modulus of 194 GPa while the thickness of the stainless steel plate is 0.6 mm; and the material of the pressure sensitive plate 101 is an acrylonitrile butadiene styrene (ABS) having a thickness of 1.2 mm and a Young's modulus of 2.2 GPa.

In a preferred embodiment, the Young's modulus of the material of panel 105≥120 GPa, the Young's modulus of the material of the pressure sensitive plate 101 is less than the Young's modulus of the material of the panel 105. In this situation, the panel 105 has a strong resistance to deformation, and a relatively weak amplification of pressure and deformation, therefore, the Young's modulus of the material of the pressure sensitive plate 101 is set preferably smaller than the Young's modulus of the material of the panel 105, so that the pressure sensitive plate may further amplify the pressure and deformation. In one embodiment, when the material of the panel 105 is stainless steel, the pressure sensitive plate 101 is a poly (methyl methacrylate) (PMMA) plate with a lower Young's modulus.

In a preferred embodiment, the Young's modulus of the material of the panel is less than 120 GPa, the Young's modulus of the material of the pressure sensitive plate 101 is equal to the Young's modulus of the material of the panel 105. In this situation, the panel 105 may be deformed at a smaller pressure, the panel 105 performs a better amplification of the pressure by itself, and it is possible to realize the pressure amplification without further reducing the Young's modulus of the pressure sensitive plate; further, from the viewpoint of material selection, when the Young's modulus of the panel 105 is small, there are fewer materials with a Young's modulus smaller than the panel 105 and is able to be the pressure sensitive plate 101. In this case, the Young's modulus of the material of the pressure sensitive plate 101 is preferably equal to the Young's modulus of the material of panel 105. In one embodiment, the material of the panel 105 may be PC, and the material of the pressure sensitive plate 101 may be PC having the same Young's modulus. In another embodiment, the material of the panel 105 with a Young's modulus of 2.2 GPa, and a material of the pressure sensitive plate 101 is a PMMA with a Young's modulus of 2.2 GPa.

In a preferred embodiment, the Young's modulus of the material of panel 105 is less than or equal to 120 GPa, and the thickness of the panel 105 is 0.3~3 mm, the Young's modulus of the material of the pressure sensitive plate 101 is less than or equal to that of Young's modulus of the panel 105. When the panel 105 has a lower Young's modulus and a thicker thickness at the same time, the panel 105 has a better amplification of pressure and deformation, at this time, the Young's modulus of the material of the pressure sensitive plate 105 is not larger than the Young's modulus of the material of the face plate 105, and a thickness for maintaining the elasticity of itself is sufficient. In one embodiment, the material of the panel 105 is FR4 fiberglass sheet having a Young's modulus of 20 GPa, and the thickness of the panel 105 of 1.0 mm; the material of the pressure sensitive plate 101 was a FR4 fiberglass sheet having a Young's modulus of 20 GPa. and the thickness of the pressure sensitive plate 101 was 0.8 mm. In another embodiment, when the material of panel 105 is a PC with a thickness of 3.0 mm, the pressure sensitive plate 101 may be a PC with a thickness of 1.0 mm.

It should be understood that the panel 105 has the property of maintaining its own rigid structure, i.e. the panel 105 should not be deformed or collapsed without external pressure. In particular, the panel 105 may be a stainless steel having a certain thickness, or the panel 105 may be a transparent PC material having a thickness sufficient to maintain the flatness of the panel 105. In one embodiment, the panel 105 may be a rigid display screen. The pressure sensitive plate 101 is attached to the back of the rigid display panel. The strain sensing unit 102 forms a detection point having a certain resolution to detect the position and force information of the press applied on the two-dimensional plane of the panel. In another embodiment, the panel 105 may be a display screen with touch function. The display screen, which functions as a display, and the touch screen, which functions as a touch-controller, may be bonded together by glue. The touch screen may be a capacitive screen or other types, such as with in cell structure, on cell structure, or the like.

Preferably, in one embodiment, in order to improve user's experience, the outer surface of the panel 105 may be provided with keys or a marking patterns. After the pressure sensitive board 101 is attached to the panel 105, its pressure sensing network may be aligned with the key or marking pattern so as to identify the preset pressing position, thus the user may press the panel 105 more accurately. At this time, the layout of the strain sensing unit 102 may be a one-to-one sensing layout corresponding to the location of the keys or other marking patterns on the panel 105, i.e., the same one or more pressure sensing elements for sensing only the pressure information of the corresponding position are applied on the position of the panel 105 where the keys or marking patterns are located on. The strain sensing unit 102 may be used only to identify the nominal number of keys on the panel.

Of course, it should be understood that the keys or other marking patterns may not be provided on the panel 105, or the positions of the keys or other marking patterns on the panel may not be in strict correspondence to the strain sensing unit 102. At this time, the strain sensing unit 102 may also be a network-like layout with a certain pitch, for example, a 4×4 matrix layout with a pitch of 20 mm. The strain sensing unit 102 may be used to identify the relative position of pressure on the panel. By locating the position on the strain sensing unit 102 and on the panel, accurate pressing information applied on the panel may be obtained.

An embodiment of the present invention provides an electronic device. The electronic device comprises the above-mentioned pressure sensor.

An embodiment of the present invention also provides another electronic device. The electronic device comprises the above-mentioned display apparatus.

The above-mentioned electronic device transfers the pressure to the strain sensing unit 102 through the pressure sensitive plate 101, thereby converting the pressure into the control information and controlling the operation of the electronic device.

The pressure sensor may be directly attached to the inner surface of the panel 105 in the above-mentioned electronic device and does not require high-precision installation requirements. The structure of the electronic device is simple, and has the advantages of low cost, convenient installation and wide applicability.

In summary, the pressure sensor, the display apparatus, or the electronic device of the present invention may transfer the pressure to the pressure sensitive plate after a pressure is applied, and after the amplification by the pressure sensitive plate, the signal is detected by the strain sensing unit and then is converted into control information, thus the controlling of the electronic device may be realized by the circuit of the external electronic device or the like. A light pressing may be detected due to the amplification by the pressure sensing plate, thus the detection sensitivity is improved, and the service life of the product is extended as well. In addition, the pressure sensor, the display apparatus, or the electronic device of the present invention has a simple structure and is easy to install, and solves the problems that the device in prior art requires high processing precision and assembling precision and needs special installation method to be used, which leads to high cost and difficulty of adoption.

The above-mentioned contents are only specific embodiments of the prevent invention, and are not intended to limit the prevent invention. Any modification, equivalent replacement, and improvement made within the spirit and principle of the present invention should be included within the protection scope of the present invention.

The invention claimed is:

1. A pressure sensor comprising:
   a stack-arranged pressure sensitive plate disposed on a surface of a panel, and
   a strain sensing arrangement disposed on a surface of the stack-arranged pressure sensitive plate,
   wherein a thickness of the pressure sensitive plate is 0.2~3 mm, and the pressure sensitive plate is made of an elastic material having a Young's modulus not larger than 120 GPa, and
   the thickness of the pressure sensitive plate is bigger than a thickness of the panel.

2. A pressure sensor according to claim 1, wherein:
   the Young's modulus of the material of the pressure sensitive plate is not larger than 80 GPa.

3. A pressure sensor according to claim 1, wherein:
   the Young's modulus of the material of the pressure sensitive plate is not larger than 40 GPa.

4. An electronic device, comprising a pressure sensor according to claim 1.

5. A display apparatus comprising:
   a stack-arranged panel,
   a pressure sensitive plate disposed on a surface of the panel, and
   a strain sensing arrangement disposed on a surface of the pressure sensitive plate,
   wherein a thickness of the pressure sensitive plate is 0.2~3 mm, the pressure sensitive plate is made of an elastic material having a Young's modulus not larger than 120 GPa, and
   the thickness of the pressure sensitive plate is bigger than a thickness of the panel.

6. A display apparatus according to claim 5, wherein:
   the Young's modulus of the material of the pressure sensitive plate is not larger than 80 GPa.

7. A display apparatus according to claim 5, wherein:
   the Young's modulus of the material of the pressure sensitive plate is not larger than 40 GPa.

8. A display apparatus according to claim 5, wherein:
   the Young's modulus of the material of the pressure sensitive plate is smaller than a Young's modulus of a material of the panel.

9. An electronic device, comprising a display apparatus according to claim 5.

10. A display apparatus comprising:
    a stack-arranged panel,
    a pressure sensitive plate disposed on a surface of the panel, and
    a strain sensing arrangement disposed on a surface of the pressure sensitive plate,
    wherein a thickness of the pressure sensitive plate is 0.2~3 mm, the pressure sensitive plate is made of an elastic material having a Young's modulus not larger than 120 GPa, and
    a thickness and a Young's modulus of a material of the panel and the thickness and the Young's modulus of the material of the pressure sensitive plate satisfy the following relationship: $E_1 \times T_1^2 > E_2 \times T_2^2$, wherein, $E_1$ is the Young's modulus of the material of the panel, $T_1$ is the thickness of the panel; $E_2$ is the Young's modulus of the material of the pressure sensitive plate, $T_2$ is the thickness of the pressure sensitive plate.

11. A display apparatus comprising:
    a stack-arranged panel,
    a pressure sensitive plate disposed on a surface of the panel, and
    a strain sensing arrangement disposed on a surface of the pressure sensitive plate,
    wherein a thickness of the pressure sensitive plate is 0.2~3 mm the pressure sensitive plate is made of an elastic material having a Young's modulus not larger than 120 GPa, and
    the Young's modulus of the material of the pressure sensitive plate is smaller than a Young's modulus of a material of the panel.

12. A display apparatus comprising:
    a stack-arranged panel,
    a pressure sensitive plate disposed on a surface of the panel, and
    a strain sensing arrangement disposed on a surface of the pressure sensitive plate,
    wherein a thickness of the pressure sensitive plate is 0.2~3 mm the pressure sensitive plate is made of an elastic material having a Young's modulus less than 120 GPa, and
    a Young's modulus of a material of the panel is less than 120 GPa, and the Young's modulus of the material of the pressure sensitive plate is equal to the Young's modulus of the material of the panel.

13. A display apparatus comprising:
    a stack-arranged panel,
    a pressure sensitive plate disposed on a surface of the panel, and
    a strain sensing arrangement disposed on a surface of the pressure sensitive plate,
    wherein a thickness of the pressure sensitive plate is 0.2~3 mm, the pressure sensitive plate is made of an elastic material having a Young's modulus not larger than 120 GPa, and
    a Young's modulus of a material of the panel is not larger than 120 GPa, and a thickness of the panel is 0.3~3 mm, the Young's modulus of the material of the pressure sensitive plate is smaller than or equal to the Young's modulus of the material of the panel.

* * * * *